United States Patent
Oh

(10) Patent No.: US 7,531,126 B2
(45) Date of Patent: May 12, 2009

(54) POWDER FABRICATING APPARATUS

(76) Inventor: Jae-Wan Oh, 10-306 Hanshin Apt. 193-1, Myeonmok 2-Dong, Jungnang-gu, Seoul, 131-202 (KR)

( * ) Notice: Subject to any disclaimer, the term of this patent is extended or adjusted under 35 U.S.C. 154(b) by 284 days.

(21) Appl. No.: 10/519,952

(22) PCT Filed: Jul. 1, 2003

(86) PCT No.: PCT/KR03/01291

§ 371 (c)(1),
(2), (4) Date: Jul. 15, 2005

(87) PCT Pub. No.: WO2004/004956

PCT Pub. Date: Jan. 15, 2004

(65) Prior Publication Data

US 2006/0051256 A1    Mar. 9, 2006

(30) Foreign Application Priority Data

Jul. 2, 2002    (KR) .................. 10-2002-0037951

(51) Int. Cl.
*B02C 19/22* (2006.01)
*B29C 47/56* (2006.01)
*B02C 23/00* (2006.01)
*B29C 45/47* (2006.01)

(52) U.S. Cl. ............ 266/235; 266/207; 266/215; 266/233; 266/241; 366/76.3; 366/83; 366/156.1; 241/186.5; 241/246; 425/587; 264/211.21

(58) Field of Classification Search .......... 266/207, 266/215, 233, 235, 241; 366/76.3, 83, 156.1; 241/186.5, 246; 425/587; 264/211.21

See application file for complete search history.

(56) References Cited

U.S. PATENT DOCUMENTS

| | | | | |
|---|---|---|---|---|
| 3,923,675 | A | * | 12/1975 | Mazdiyasni et al. ... 252/62.9 PZ |
| 4,607,797 | A | * | 8/1986 | Enikolopow et al. .......... 241/23 |
| 5,415,354 | A | * | 5/1995 | Shutov et al. ................. 241/16 |

FOREIGN PATENT DOCUMENTS

CN    1334156    2/2002

(Continued)

OTHER PUBLICATIONS

Notification of First Office Action corresponding to Chinese Application No. 038201763 dated Apr. 7, 2006.

*Primary Examiner*—Roy King
*Assistant Examiner*—Lois L. Zheng
(74) *Attorney, Agent, or Firm*—Portland IP Law, LLC

(57) ABSTRACT

The present invention relates to a powder fabricating apparatus. It is an object of the present invention to provide the powder fabricating apparatus, which is capable of obtaining metal powder in a rapid and continuous fashion, various kinds of oxide, or alloy powder. The powder fabricating apparatus for achieving the object of the present invention comprises a barrel wherein an inlet and an outlet are formed at both opposite ends thereof, respectively; a screw which is rotationally mounted in the barrel and by which reactant supplied from the inlet moves toward the outlet; a driving portion for causing a relative rotational motion between the screw and the barrel; reaction control means for controlling reaction conditions of the reactant which moves in the barrel; and a controller for controlling the driving portion and the reaction control means.

13 Claims, 4 Drawing Sheets

FOREIGN PATENT DOCUMENTS

| | | |
|---|---|---|
| CN | 1334159 | 2/2002 |
| GB | 2324781 * | 11/1998 |
| JP | 51-124857 | 10/1976 |
| JP | 62-180745 | 8/1987 |
| JP | 63-285121 | 11/1988 |
| JP | 02-307725 | 12/1990 |
| JP | 09-184024 | 7/1997 |
| JP | 11-212572 | 8/1999 |
| JP | 2000-119710 | 4/2000 |
| JP | 2000-233817 | 8/2000 |
| KR | 1996-0022384 | 7/1996 |
| KR | 2001-0049968 | 6/2001 |
| KR | 2002-0034723 | 5/2002 |

* cited by examiner

POWDER FABRICATING APPARATUS

BACKGROUND OF THE INVENTION

1. Field of the Invention

The present invention relates to a powder fabricating apparatus, more specifically, to a continuous powder fabricating apparatus by using a screw, wherein said apparatus can obtain metal powder easily and rapidly, in which the metal powder has an important position in the industrial field.

2. Description of the Related Art

Generally, metal powder, which is metal particle at a size less than 1,000 μm, is characterized by fluidity, mixability, compressibility, moldability, explosiveness, sintering and the like. The properties of the metal powder change according to not only its ingredient but also the size or shape of the particle. There are various kinds of metal powder such as iron, aluminum, copper, nickel, zinc, manganese, rare-earth elements, platinum group metals and rare metals.

Among them, rare-earth elements, which consist of 17 elements, lanthanum (La, atomic number 57) to lutetium (Lu, atomic number 71), scandium (Sc, atomic number 21) and yttrium (Y, atomic number 39), may become a metallic oxide that has a high melting point and is difficult to be reduced. The platinum group elements have a high melting point and are uneasily oxidizable, corrosive, noble metals, which are composed of 6 elements (ruthenium, rhodium, palladium, osmium, iridium and platinum) of Group 8 in the periodic table, not including the iron group. Rare metals (scarcity metals or minor metals) are necessary to support a high level of technology despite a low production scale. There are 3 classes of rare metals: the first class consists of silicon, sodium, manganese, potassium, calcium, titanium and the like, which are predominately found in the earth's crust though difficult to smelt; the second class consists of arsenic, bismuth, selenium, antimony, cadmium, cobalt, tellurium and the like, which are less likely to be found in the earth's crust although easy to smelt; the third class consists of germanium, niobium, lithium, molybdenum, barium, beryllium, boron, cerium, strontium, uranium, indium, zirconium, potassium, tantalum, thallium, wolfram, thorium, hafnium and the like, which are sparsely found in the earth's crust and difficult to smelt. The increasing demand for rare metals parallels the rapid development of the IT industry, particularly the electronics and communications fields.

Niobium (Nb) is characterized by a low-neutron absorbing sectional area, good ductility, oxidation-resistance, heat-resistance, impact-resistance and high transition temperature, and is widely used in the fields of nuclear fusion or nuclear power technology, space development, high electric power transmission and superconductors. Tantalum (Ta) has a high melting point and low vapor pressure, good ductility, mechanical strength and oxidation-resistance. As such, the demand for tantalum has dramatically increased in the electric, electronic and/or chemical industries. As indicated above, tantalum and niobium, which are generally used in materials of electronic components or agents for improving physical properties, have high melting points and high resistance for a chemical agent. Thus, a metal thermo-reducing method, in which $K_2TaF_7$ or $K_2NbF_7$ is a reactant and metals such as Na, K, Ca or Al are used when the powder (nano particle) is fabricated, has been employed.

Until now, batch-type metal powder fabricating apparatuses have been used. The conventional batch-type metal powder fabricating apparatus, as shown in FIG. 5, comprises a reactant supplier 100, a reaction bath 200, a mixer 300 for mixing the reactant supplied to the reaction bath 200 and a heater 500, which is mounted around the reaction bath 200 for heating the reaction bath 200. In the conventional batch-type metal powder fabricating apparatus, after a dose of the reactant is added into the reaction bath 200 through the reactant supplier 100, a dose of the product can be obtained by completing the reaction with the mixer 300 and the heater 500.

However, the conventional batch-type metal powder fabricating apparatus is inconvenient because it is difficult to analyze the reaction of the reactant, requires a long time for reaction and is large to guarantee productivity. Also, a reactant or reducing agent is gradually supplied in order to control reactant heat, or many diluents are supplied in order to control a reaction rate, which prolongs the reaction time. In addition, a diluent of high purity should be used to reduce a pollution source from the diluent. Since the diluent itself becomes reaction waste, it is also inefficient. Particularly, in the conventional batch-type or semi-batch type reactor, the overall reaction time or grain growth time is a very important factor in determining grain-size distribution because an average size of a first particle is determined by such grain growth time to the overall reaction rate. However, since such reactors depend solely on a time control method to control grain-size distribution, it is very difficult to obtain a product whose grain-size distribution is uniform.

SUMMARY OF THE INVENTION

It is an object of the present invention to solve the above problems by means of the powder fabricating apparatus, which is capable of obtaining metal powder in a rapid and continuous fashion, various kinds of oxide, or alloy powder, which have a very important position in the industrial field.

The powder fabricating apparatus for achieving the object of the present invention comprises a barrel wherein an inlet and an outlet are formed at both opposite ends thereof, respectively; a screw which is rotationally mounted in the barrel and by which reactant supplied from the inlet moves toward the outlet; a driving portion for causing a relative rotational motion between the screw and the barrel; reaction control means for controlling reaction conditions of the reactant which moves in the barrel; and a controller for controlling the driving portion and the reaction control means.

The reaction control means may comprise a temperature control device, an electron supply device for applying electrons into the barrel, or a concentration control device for controlling concentration of the reactant in the barrel. The powder fabricating apparatus may further comprise at least one atmosphere providing device for providing a predetermined reaction atmosphere into said barrel. The atmosphere providing device may provide a vacuum, inert, oxidizing, reducing, vacuum inert, vacuum oxidizing, or vacuum reducing atmosphere. The barrel may be separated into plural zones, said reaction control means are mounted in the predetermined zones, and said controller may control said reaction control means independently at each zone so that the reaction condition of the reactant is independently controlled in each zone. Such a barrel may be separated into four zones: a nuclei generating zone, a reaction buffering zone, a major reaction zone and a grain ripening zone, and said reaction control means may provide each zone with the reaction condition corresponding thereto. The barrel may be provided with plural sensors for measuring reaction status, and said controller may control said reaction control means on the basis of the status measured from the sensors. The surface of the groove of said screw may be provided with plural projections. Plural screws may be mounted parallel in said barrel. The groove diameter of said screw may change along an axial distance of said screw. The distance between two adjacent grooves, also known as pitch, may change along the axial distance of said screw. A reactant feeder may be connected to said inlet, and a mixer may be provided in said reactant feeder in order to mix the reactant. A collector may be connected to said outlet, and a condenser may be provided in said collector in order to collect material which has a low boiling point or non-reactant by evaporating and condensing it.

The method for fabricating powder for achieving the object of the present invention comprises steps of injecting reactant into a reactor; causing the reactant to react continuously at the same time while it is mixed and moves spirally in the reactor; ripening and cooling the reactant while it moves spirally in the reactor after the reaction is completed; discharging product after the reaction and cooling are completed.

The step of causing the reactant to react continuously may comprise a step of causing the reactant to move through a nuclei generating zone, a reaction buffering zone, and a major reaction zone, wherein each of the reaction conditions are controlled independently. The reactor may have separate reaction spaces that are connected with each other, and reaction occurs while the reactant moves through said reaction spaces.

DETAILED DESCRIPTION OF PREFERRED EMBODIMENTS

Preferred embodiments of the powder fabricating apparatus according to the present invention are explained below with reference to the drawings. There may be many embodiments of the present invention, through which the object, features and advantages of the present invention can be more comprehensive.

The powder fabricating apparatus according to the present invention is proposed to obtain easily and rapidly a metal powder, various kinds of oxide, and alloy powder, which have a very important position in the industrial field. The powder fabricating apparatus is designed so that the reactant can move spirally and react continuously at the same time by using a screw 40, which is mounted rotationally in a barrel 20.

Figure 1:
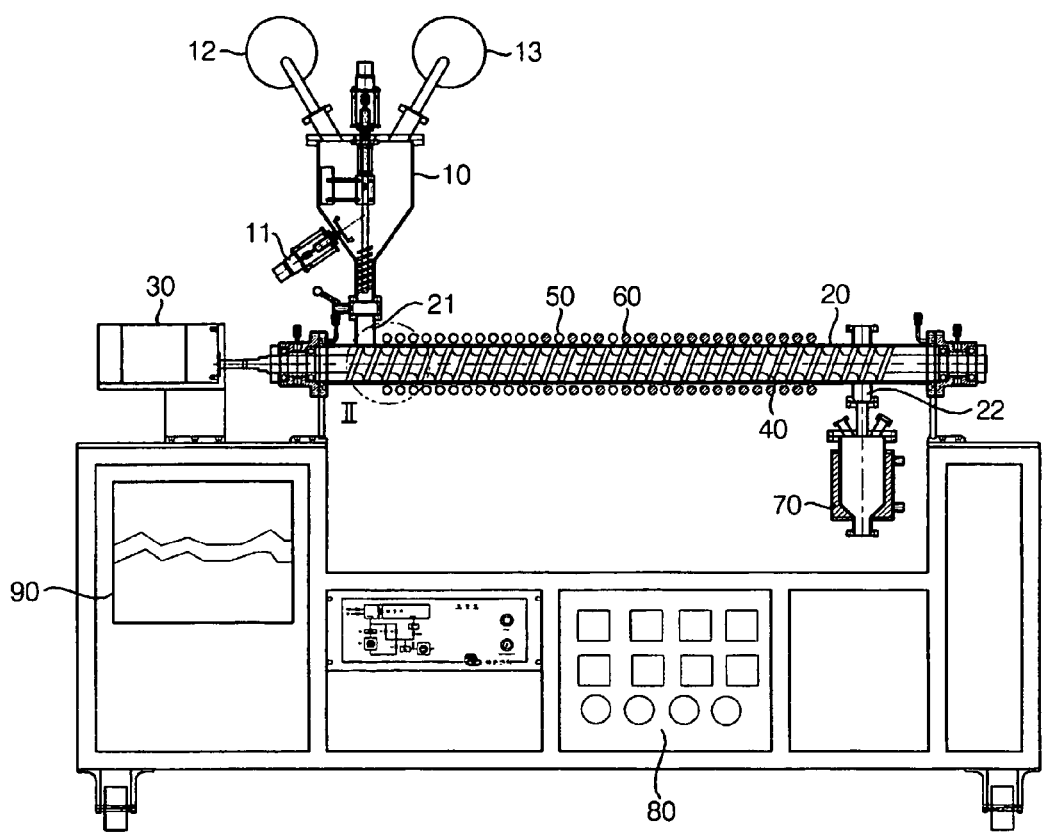
FIG. 1 is a front view of the powder fabricating apparatus according to the present invention with a major portion thereof shown as a cross-sectional view.
Figure 2:
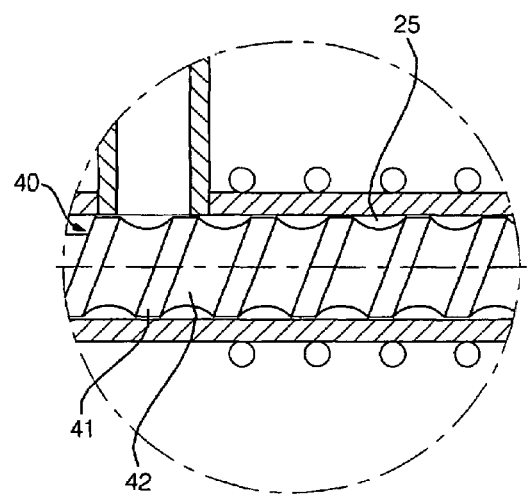
FIG. 2 is an enlarged sectional view of circle II in FIG. 1.

As shown in FIG. 1, the powder fabricating apparatus according to the present invention comprises the barrel 20 which has an inlet 21 and an outlet 22 at opposite ends of the barrel 20, respectively; the screw 40 which is mounted rotationally in the barrel 20, and a motor 30, as a driving portion, which rotates the screw 40. The screw 40 in the barrel 20 mixes the reactant supplied from the inlet 21 and continuously transfers the reactant toward the outlet 22. That is, as shown in FIG. 2, the screw 40 includes a thread 41 and a groove 42, wherein the top surface of the thread 41 comes in contact with the inside wall of the barrel 20 and the groove 42 and the inside wall of the barrel 20 form a reaction space 25 that is a spiral passage capable of moving the reactant. Thus, due to a relative rotational motion between the barrel 20 and the screw 40, the reactant moves from the inlet 21 to the outlet 22 along the reaction space 25. A reaction control means is provided which controls reacting conditions of the reactant in order for the reactant to react while moving in the barrel 20.

As an example of such a reaction controlling means, a heater 50 and a cooler 60 are mounted around the barrel 20 so that the temperature in the barrel is controlled through said heater 50 and cooler 60. For example, as shown in FIG. 1, the heater 50 is mounted on the side of the inlet 21 of the barrel 20, the cooler 60 is mounted on the side of the outlet 22 of the barrel 20, and the heater 50 and cooler 60 are mounted alternately between the inlet 21 and the outlet 22. However, a structure for controlling the reactant efficiently is not limited to that shown in FIG. 1. The reaction control means refers not only to temperature control devices, such as the heater 50 and cooler 60, but also to an electron supply device for applying electrons to the reactant, a concentration control device for controlling the concentration of the reactant, an irradiator for irradiating a ultraviolet ray or an infrared ray, or other devices for controlling reaction conditions of the reactant. As the temperature control device, the heater 50 may use a heating wire with electric resistance, electro magnetic induction, electromagnetic force, a high frequency, and a plasma heat source, a torch lamp and the like. The cooler 60 may use a liquid or gas phase coolant such as cooling water and alcohol. The electron supply device, which adds electrons into the barrel, can induce the movement of electrons by applying direct or alternating currents (including pulse power) to the screw and the barrel, which are used as electrodes. There is also a diluent supply device that, as a concentration control device for controlling the concentration of the reactant, injects a diluting agent through the inlet 21 of the barrel or a reactant feeder 10 attached to the inlet 21. In the case that the reactant is diluted at a predetermined position while the reactant moves and reacts in the barrel, the diluent supply device may supply the diluting agent through a through-hole formed at the predetermined position of the barrel.

FIG. 1, for example, shows that the reactant in the barrel 20 begins to react by being heated at a proper reaction temperature after it is preheated by the heater 50. At this time, a reaction heat at a high temperature of 300~1,400° C. is removed by mounting the cooler 60 in the intermediate zone—the heater 50 and the cooler 60 are mounted alternately—and in the side of the outlet 22. The apparatus is designed so that the product, which is produced as the reactant moves spirally by the screw 40, by means of preheating→heating (reaction)→cooling, is collected in a product collector 70 that is mounted at one end of the barrel 20.

The reactant feeder 10 is attached to the inlet 21 of the barrel 20 to facilitate the supply of the reactant into the barrel 20. The reactant feeder 10 is provided with a stirrer 11 as a mixer for fabricating metal powder having high purity; is communicated with one or more material supply sources 12 for supplying a reactant, reducing agent, oxidizing agent or diluent; and is connected to an atmosphere supply device 13 for switching the atmosphere to a vacuum and injecting an inert gas such as $N_2$, Ar, and He and the like. By using a pump, the atmosphere supply device 13 can produce a vacuum state inside the barrel 20. An inert atmosphere, oxidizing atmosphere or reducing atmosphere may be formed as necessary by introducing a proper amount of inert gas, oxidizing gas or reducing gas into the barrel 20. For example, the atmosphere supply device 13 may provide an oxygen atmosphere to fabricate an oxide and a predetermined atmosphere in order to fabricate an alloy. Although the atmosphere supply device 13 shown in FIG. 1 is communicated with the reactant feeder 10, the atmosphere supply device 13 may communicate with the inside of the barrel at a predetermined position of the barrel 20.

The product produced from the reactant that reacts in the barrel 20 is discharged through the outlet 22 provided at the opposite end of the inlet 21 of the barrel. The outlet 22 is connected with the product collector 70 for collecting the discharged product. In fact, the product in the collector 70 may contain non-reactants, which can be separated in post-processes. Said product collector 70 may also be provided with a condenser that collects material at a low boiling point from the product or the non-reactant through evaporation and condensation. This is for an effective cleaning process later. The product can be easily achieved if the reducing agent, which has a low boiling point, is first removed in the cleaning process, since an explosive reaction occurs if alkali metals and other such metals meet water, alcohol, carbon tetrachloride and the like in the cleaning process.

Meanwhile, the constitutions such as the reactant feeder 10, the stirrer 11, the material supply source 12, the atmosphere supply device 13, the motor 30, the heater 50, the cooler 60 and the product collector 70 are controlled by a controller 80. Measuring sensors such as a thermometer, a manometer and a flow meter may be mounted at predetermined positions of the barrel 20 in order to measure physical signals such as temperature, pressure, flow rate and/or flux of the reactant and the product, which move in the barrel 20. The measured conditions of the reactant and product are displayed through a monitor 90. The controller 80 may control the heater 50 and the cooler 60 by the physical signals.

Figure 3:
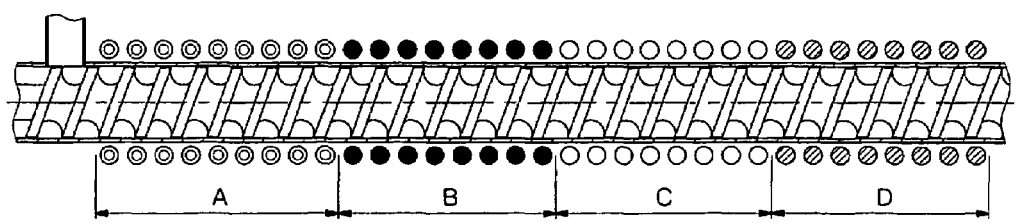
FIG. 3 is a view showing a barrel and a reaction control means wherein the reactant is subjected to plural fabricating processes in the powder fabricating apparatus according to the present invention.

The reactant that moves in the barrel 20 is often subjected to a nuclei generating step, a major reaction step and a grain ripening step. The powder fabricating apparatus of the present invention continuously fabricates the desired product since these processes are performed in a barrel successively. As an embodiment for the above, FIG. 3 shows an example of a reactant reacting in sequence wherein the barrel 20 is separated into four zones: a nuclei generating zone (A), a reaction buffering zone (B), a major reaction zone (C) and a grain ripening zone (D). The reaction controlling means, each of which is generally an independent constitution, are mounted at each zone of the barrel 20. The controller 80 controls each of the reaction controlling means independently, which are mounted at each zone, to satisfy the respective reaction conditions of each zone.

The nuclei generating zone (A), which generates nuclei or seeds of particles, is driven at a relatively lower temperature than that of the major reaction zone so as to easily control the major reaction zone. The reaction buffering zone (B) separates the nuclei generating zone (A) and the major reaction zone (C) thermally. Since a high reaction temperature generally occurs in the major reaction zone, the temperature of the reactant rises and the reaction rate increases. The increase in reaction rate affects the vicinity thereof in succession. Therefore, the reaction buffering zone (B) acts to prevent the major reaction zone (C) from affecting the nuclei generating zone (A). In the reaction buffering zone (B), the cooler may be driven, or neither heater nor cooler may be driven. In the latter case, not as shown in FIG. 3, neither the heater nor the cooler may be mounted. The major reaction zone (C), in which the reaction (or grain growth) occurs, is provided with an optimal reaction condition by the reaction control means. The grain ripening zone (D), in which the grown grains are ripened once the grains sufficiently grow after the reaction is completed, ripens the grains and cools the product to complete the reaction. Finally, the product of the desired powder is obtained through the outlet 22.

As a preferred embodiment, the present invention can fabricate powder using a metallothermic reduction method, as explained below.

First, the reactant ($K_2TaF_7$, $K_2NbF_7$, $TaCl_4$ or the like) together with the reducing agent (Na, K, Ca, Al or the like) and the diluent (NaCl, NaF, KF or the like), are supplied into the reactant feeder 10 through the material supply source 12 and are mixed with the stirrer 11. The inside of the reactant feeder 10 and the barrel 20 form a vacuum with the atmosphere supply device 13. Inert gas is supplied into the reactant feeder 10 and the barrel 20. The reactant is introduced into the barrel 20 after being mixed in the reactant feeder 10 by the stirrer 11, and moves along the reaction space 25 formed by the screw 40, which is rotated by a motor 30.

The major reaction zone is controlled at the range from 700 to 1,000° C. with the heater 50 mounted around the barrel 20 so that the reactant is subjected to a thermic reducing reaction. Just before or after the completion of the thermic reducing reaction in the major reaction zone, the product is ripened and cooled through the grain ripening zone in which the cooler 60 is driven.

The product containing tantalum (Ta) or niobium (Nb), which is produced in the barrel 20, is then collected in the product collector 70. Next, the metal powder can be obtained by dissolving, reducing, and collecting the tantalum or niobium from a reducing agent or diluent through separate processes. The process is expressed by the following formulas:

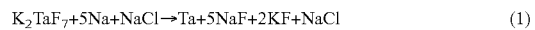
$$K_2TaF_7 + 5Na + NaCl \rightarrow Ta + 5NaF + 2KF + NaCl \quad (1)$$

wherein $K_2TaF_7$ is the reactant, Na is the reducing agent and NaCl is the diluent; and

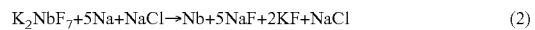
$$K_2NbF_7 + 5Na + NaCl \rightarrow Nb + 5NaF + 2KF + NaCl \quad (2)$$

wherein $K_2NbF_7$ is the reactant, Na is the reducing agent and NaCl is the diluent.

As described above, the screw-type continuous powder fabricating apparatus according to the present invention collects the product more easily through the reaction and cooling processes while the reactant moves continuously by the screw 40. This can significantly contribute to improved productivity. In addition, since the reaction progresses after the temperature of the reactant reaches a reaction start temperature using the heater 50 while the reactant moves mechanically by the screw 40, and since the product is cooled while it passes through the grain ripening zone after the reaction is completed in the major reaction zone, the apparatus shows the advantage that it can manage fabrication of the powder effectively.

In particular, since the reaction and cooling processes can be performed continuously while the reactant moves by the screw 40, the apparatus of the present invention can be reduced in size by reducing the diameter of the barrel compared with the conventional reactor.

As another preferable embodiment, the present invention can fabricate powder using an electron migration reduction method, as explained below. In this case, an electron supply device must be installed instead of a heater 50, as in FIG. 1.

In using the electron migration reduction method, the reactant is subjected to two steps of reduction and oxidation as expressed by the following formulas:

$$MX + e^- \rightarrow M + X^- \quad (3)$$

$$R \rightarrow R^+ + e^- \quad (4)$$

When the electron supply device applies electrons to the reactant as formulas (3) and (4), electronic mobility may increase by increasing a current in order to accelerate reduction of MX. In such a case, the reaction progresses smoothly without any physical contact between the reactant and reducing agent due to the movement of the electrons.

The process of fabricating the metal powder, Ta, using the reducing agent, Na, is explained below. For example, the metal powder for a superior condenser, Ta, having high purity, is fabricated with Ta fluoride and an Na reducing agent by the following formulas:

$$K_2TaF_7 + 5Na \rightarrow Ta + 2KF + 5NaF \quad (5)$$

wherein $K_2TaF_7$ is the reactant, and 5Na is the reducing agent.

Due to the movement of the electrons, the formulas are expressed as follows:

$$Ta^{5+} + 5e^- \rightarrow Ta \quad (6)$$

$$Na \rightarrow Na^+ + e^- \quad (7)$$

Therefore, in the case that, as in formula (6), reduction occurs with the movement of the electrons in the barrel 20 while the reactant moves continuously by the screw 40, the Ta grows uniformly so that the metal powder is obtained smoothly.

On the other hand, the process of fabricating the metal powder, Ta, using an Mg reducing agent, is fabricated by the following formulas:

$$2TaCl_5 + 5Mg \rightarrow 2Ta + 5MgCl_2 \quad (8)$$

Even in this case, the formulas are expressed as follows due to the movement of the electrons:

$$Mg \rightarrow Mg^{2+} + 2e^- \quad (9)$$

$$TaCl_5 + 5e^- \rightarrow Ta + 5Cl^- \quad (10)$$

In addition, it is natural that the present invention is embodied into various embodiments. For example, metal powder, Nb, is fabricated by using a reactant of $Nb_2O_5$ and a reducing agent of Ca and using the movement of the electrons. First of all, the present invention is characterized in that the reactant moves continuously in the barrel 20 by the screw 40 and in that the heater 50 or the electron supply device is used.

Figure 4A:
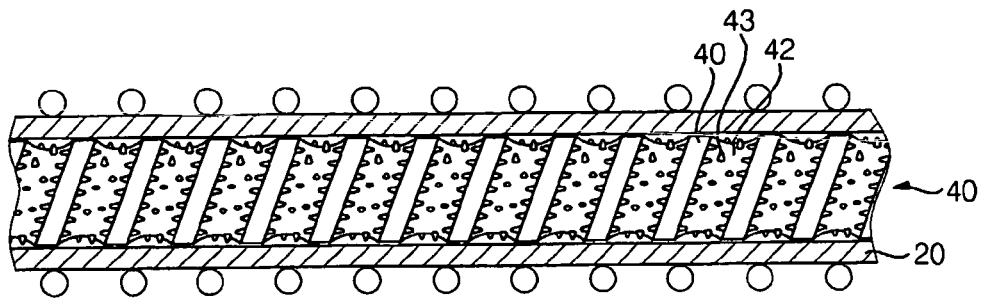
FIGS. 4a to 4c are cross-sectional views of various modifications of the screw that is mounted in the barrel.

Therefore, since the powder fabricating apparatus according to the present invention uses the screw 40, a reactant or a mixture of reactants with a non-uniform phase can be fed continuously with precise quantities and regular form, which is impossible in the conventional batch-type or semi-batch type powder fabricating apparatus. Since the powder fabricating apparatus according to the present invention also uses space between the screw 40 and barrel 20 as reaction space, a position control in the axial direction of the barrel or the spiral direction of the screw can be applied. The growth rate of particles can thus be controlled accurately according to the desired size of the particles. Since the heater 50 of the present invention may be installed outside the barrel or in the screw, contrary to the heating means installed in the conventional batch-type or semi-batch type reactor, a heater installing area per unit volume of reactor increases rapidly so that temperature is advantageously controlled. In addition, the reaction with movement of electrons using the screw and barrel as electrodes is easily realized. Reaction heat is also easily removed since it is easy to install the cooler 60. Two or more blades are attached to the screw 40 coaxially so that the range of usage of the screw 40 can be widened. As shown in FIG. 4a, the mixing effect of the reactant is improved by forming the projections 43 on the surface of the groove 42 and/or the side surface of the thread 41 of the screw 40. Thickness and size of the barrel 20 is adjusted according to the parameters of the reaction conditions, and the reactant receives positive stimuli by driving the screw in a pulsatory pattern with projecting portions (not shown) provided inside the barrel 20, so that more uniform metal powder can be achieved. If the screw is driven in the pulsatory pattern or a recycling part is provided, reaction length and mixing effect can be maximized.

Figure 4B:
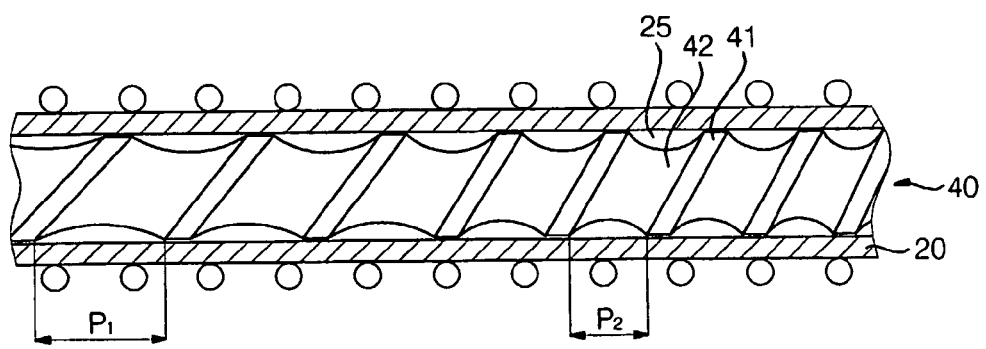
Figure 4C:
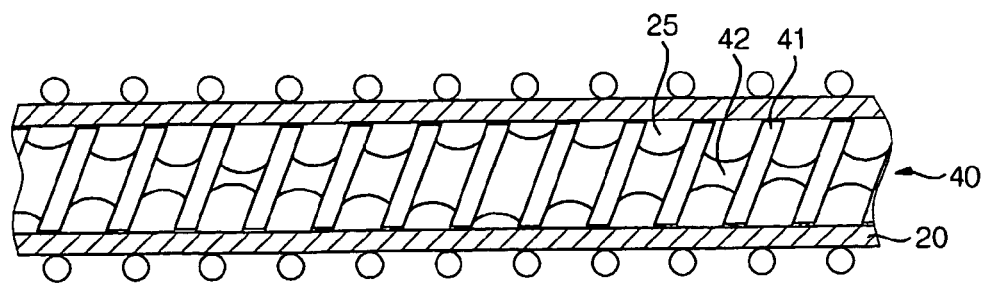
Figure 5:
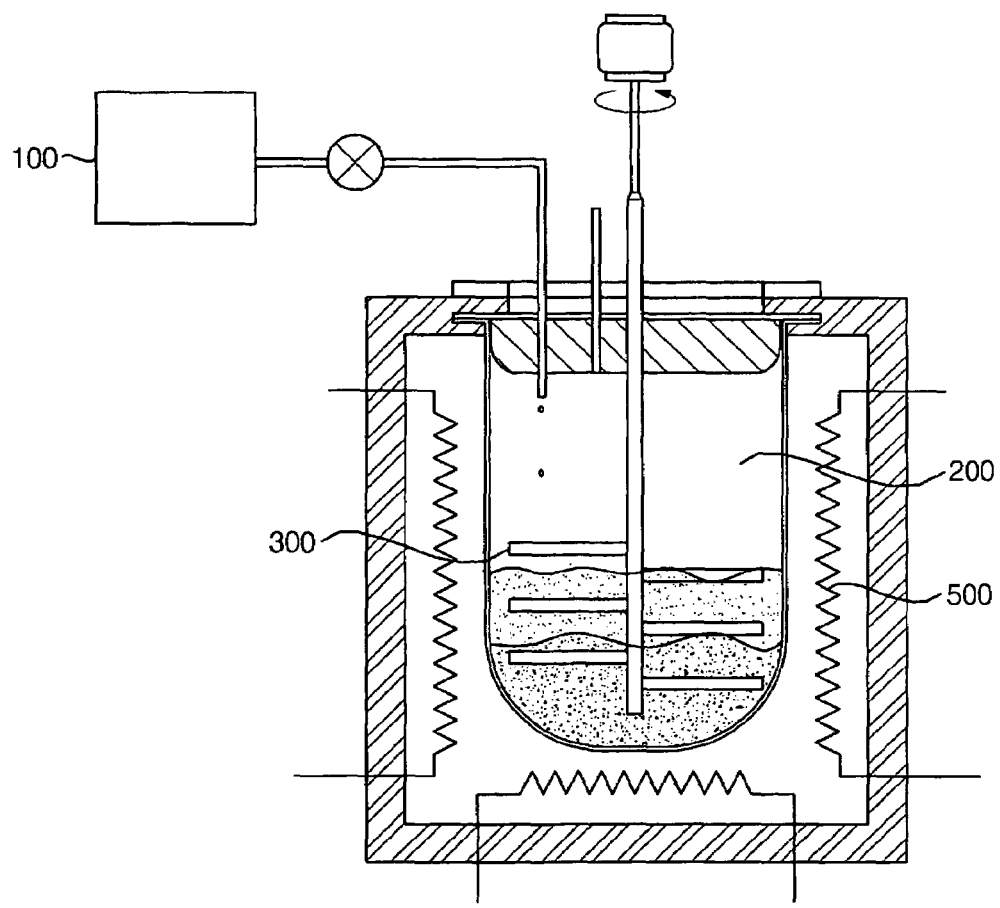
FIG. 5 is a cross-sectional view of a conventional batch-type powder fabricating apparatus.

As constitutions for achieving additional effects of the powder fabricating apparatus, two to five screws may be installed multi-axially inside the barrel 20 so that the mixing effect of the reactant and the capacity for the reactant can be increased, and the reactant can be prevented from being burned and attached to the screw or barrel. FIG. 4b shows that the pitches $P_1$, $P_2$, each of which is a distance between the same points on the adjacent threads 41 of the screw 40, may change along the axial distance of the screw 40. Otherwise, as shown in FIG. 4c, the groove 42 of the screw 40 may change in diameter along the axial distance of the screw 40. Accordingly, pressure of the reaction space (for gas phase) and concentration (for solid, slurry, or liquid phase) in the barrel 20 can be controlled locally along the axial distance of the barrel 20 by adjusting the size of the reaction space.

As described above, the powder fabricating apparatus according to the present invention can easily fabricate metal powder (nano powder) having a size that is difficult to achieve by a conventional batch-type metal powder fabricating apparatus. The powder fabricating apparatus also fabricates powder whose grain-size distribution is uniform and size is small. In such a case, it is natural that the product at the completion of the reaction is in liquid and/or solid state. In particular, productivity is largely improved since the product is produced continuously by the screw.

Also, while the reactant moves mechanically by the screw, the reaction heat is effectively controlled by using the cooler 60 through the grain ripening zone once the temperature of the reactant reaches a reaction start temperature due to the heat of the reaction control means, or once the reaction occurs using the movement of electrons of the reaction control means.

Since the mixing of impurities is easily controlled by changing the quality of the barrel and the screw according to the reaction temperature or the kind of reactant, the metal powder (fine powder) with high purity accompanied with high reaction heat can be fabricated easily and advantageously.

Particularly, since the present invention can provide reaction space by the screw in the barrel, the continuous powder fabricating apparatus is provided in the form of plural minute reactors, each of which has the size of several mm³, and which are connected with each other. It is thus possible to further shorten the reaction time, easily control the reactant and minimize the size of the apparatus. Accordingly, it is possible to lower investment costs in initial productions and to effectively cope with the size, shape, distribution, and degree of purity of the particle, and with the mass production of the powder.

Although the powder fabricating apparatus according to the present invention has been described with reference to the accompanying drawings and the concrete embodiments, the present invention is not limited to such drawings or embodiments. Various modifications and alterations, which are interpreted by the claims, can be made within the technical spirit of the present invention. For example, an oxygen group, an organic compound, and a halide may be applied to the reduction using an alkali group or alkaline earth group in accordance with the control of the atmosphere in the reactant feeder and the reaction control means. It is also natural that the present invention is effectively applied to fabricating an oxide by the oxidation of an organic compound and a halide.

What is claimed is:

1. A powder fabricating apparatus comprising:
    a barrel wherein an inlet and an outlet are formed at both opposite ends thereof, respectively;
    a screw which is rotationally mounted in the barrel and by which reactant supplied from the inlet moves toward the outlet;
    a driving portion for causing a relative rotational motion between the screw and the barrel;
    reaction control means for controlling reaction conditions of the reactant which moves in the barrel to induce a chemical reaction of the reactant, wherein said reaction control means comprises an electron supply device for applying electrons into the barrel using the barrel and the screw as electrodes for reduction of the reactant; and
    a controller for controlling the driving portion and the reaction control means;
    wherein said barrel is separated into plural zones, said reaction control means are mounted in predetermined zones, and said controller controls said reaction control means independently at each zone so that the reaction condition of the reactant is independently controlled in each zone.

2. The powder fabricating apparatus according to claim 1, wherein said reaction control means comprises a temperature control device.

3. The powder fabricating apparatus according to claim 1, wherein said reaction control means comprises a concentration control device for controlling concentration of the reactant in the barrel.

4. The powder fabricating apparatus according to any one of claims 1, 2 and 3, further comprising at least one atmosphere providing device for providing a predetermined reaction atmosphere into said barrel.

5. The powder fabricating apparatus according to claim 4, wherein said atmosphere providing device provides a vacuum, inert, oxidizing, reducing, vacuum inert, vacuum oxidizing, or vacuum reducing atmosphere.

6. The powder fabricating apparatus according to claim 1, wherein said barrel is separated into four zones: a nuclei generating zone, a reaction buffering zone, a major reaction zone and a grain ripening zone, and said reaction control means provides each zone with the reaction condition corresponding thereto.

7. The powder fabricating apparatus according to any one of claims 1, 2 and 3, wherein said barrel is provided with plural sensors for measuring reaction status, and said controller controls said reaction control means on the basis of the status measured from the sensors.

8. The powder fabricating apparatus according to any one of claims 1, 2 and 3, the screw comprises a thread and a groove, wherein the surface of the groove of said screw is provided with plural projections.

9. The powder fabricating apparatus according to any one of claims 1, 2 and 3, wherein plural screws are mounted parallel in said barrel.

10. The powder fabricating apparatus according to any one of claims 1, 2 and 3, the screw comprises a thread and a groove, wherein the groove diameter of said screw changes along an axial distance of said screw.

11. The powder fabricating apparatus according to any one of claims 1, 2 and 3, the screw comprises a thread and a groove, wherein the distance between two adjacent grooves, also known as pitch, changes along an axial distance of said screw.

12. The powder fabricating apparatus according to any one of claims 1, 2 and 3, wherein a reactant feeder is connected to said inlet, and a mixer is provided in said reactant feeder in order to mix the reactant.

13. The powder fabricating apparatus according to any one of claims 1, 2 and 3, wherein a collector is connected to said outlet, and a condenser is provided in said collector in order to collect material which has a low boiling point or non-reactant by evaporating and condensing it.

* * * * *